US012738662B2

(12) United States Patent
Kim et al.

(10) Patent No.: US 12,738,662 B2
(45) Date of Patent: Sep. 15, 2026

(54) OMNIDIRECTIONAL ANTENNA

(71) Applicant: ELECTRONICS AND TELECOMMUNICATIONS RESEARCH INSTITUTE, Daejeon (KR)

(72) Inventors: Jong Ho Kim, Daejeon (KR); Youngsu Kim, Seongnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 38 days.

(21) Appl. No.: 19/052,605

(22) Filed: Feb. 13, 2025

(65) Prior Publication Data

US 2025/0372881 A1 Dec. 4, 2025

(30) Foreign Application Priority Data

Jun. 3, 2024 (KR) ........................ 10-2024-0072593

(51) Int. Cl.

*H01P 5/107* (2006.01)
*H01Q 1/42* (2006.01)
*H01Q 13/20* (2006.01)

(52) U.S. Cl.

CPC ............. *H01Q 13/206* (2013.01); *H01Q 1/42* (2013.01)

(58) Field of Classification Search

CPC ........ H01Q 1/42; H01Q 13/06; H01Q 13/065; H01Q 13/08; H01Q 13/20; H01Q 13/206; H01Q 21/205; H01P 3/12; H01P 5/00; H01P 5/107

See application file for complete search history.

(56) References Cited

U.S. PATENT DOCUMENTS

| | | | | |
|---|---|---|---|---|
| 8,743,004 B2 * | 6/2014 | Haziza | H01Q 21/0043 | 343/775 |
| 2006/0055605 A1 * | 3/2006 | Peled | H01Q 1/245 | 343/702 |
| 2007/0085626 A1 | 4/2007 | Lee et al. | | |
| 2007/0273599 A1 * | 11/2007 | Haziza | H01Q 3/22 | 343/772 |
| 2008/0117113 A1 * | 5/2008 | Haziza | H01Q 13/0233 | 343/786 |
| 2018/0090846 A1 * | 3/2018 | Seo | H01Q 13/02 | |
| 2022/0407231 A1 * | 12/2022 | Ghosh | H01Q 9/045 | |

FOREIGN PATENT DOCUMENTS

| | | |
|---|---|---|
| KR | 10-2002-0048352 A | 6/2002 |
| KR | 10-2005-0063307 A | 6/2005 |
| KR | 10-0960018 B1 | 5/2010 |
| KR | 1020140132963 A | 11/2014 |
| KR | 1020160142580 A | 12/2016 |

(Continued)

*Primary Examiner* — Thai Pham
(74) *Attorney, Agent, or Firm* — Rabin & Berdo, P.C.

(57) ABSTRACT

An omnidirectional antenna is provided. The omnidirectional antenna includes a waveguide configured to transmit a fed signal, a microstrip line configured to radiate the fed signal transmitted from the waveguide, and a radiation guide configured to guide the signal radiated from the microstrip line to omnidirectionally radiate the signal, wherein a waveguide cavity of the waveguide is bent at least once within the waveguide so that two surfaces of the microstrip line meet perpendicularly to a central axis of the waveguide cavity.

9 Claims, 5 Drawing Sheets

(56) References Cited

FOREIGN PATENT DOCUMENTS

| | | | | | |
|---|---|---|---|---|---|
| KR | 10-2017-0113298 | A | | 10/2017 | |
| KR | 1020190138945 | A | | 12/2019 | |
| KR | 10-2430284 | B1 | | 8/2022 | |
| KR | 20230127550 | A | * | 9/2023 | ............ H01Q 13/06 |
| KR | 1020230127550 | A | | 9/2023 | |

* cited by examiner

OMNIDIRECTIONAL ANTENNA

CROSS-REFERENCE TO RELATED APPLICATION

This application claims the benefit of Korean Patent Application No. 10-2024-0072593, filed on Jun. 3, 2024, in the Korean Intellectual Property Office, the entire disclosure of which is incorporated herein by reference for all purposes.

BACKGROUND

1. Field of the Invention

One or more embodiments relate to an omnidirectional antenna.

2. Description of the Related Art

An omnidirectional antenna is an important device not only for wireless communication but also for radio channel research. A terahertz band wireless signal may be fed through a waveguide. When the terahertz band wireless signal is fed through the waveguide, it may be difficult to implement an omnidirectional antenna.

The above description has been possessed or acquired by the inventor(s) in the course of conceiving the present disclosure and is not necessarily an art publicly known before the present application is filed.

SUMMARY

A radio wave radiated through a waveguide may be oriented in a particular direction due to a waveguide structure. Because of characteristics of being oriented in a particular direction, the waveguide is easily and widely used to manufacture a directional antenna. However, there may be cases where radio waves are supplied by the waveguide but need to be radiated in all directions. Therefore, implementation of an omnidirectional antenna including a waveguide structure is absolutely necessary.

When fed from the waveguide, the implementation of the omnidirectional antenna may be difficult due to the waveguide structure. As a frequency of the supplied radio waves increases, a wavelength of the radio waves may decrease. The omnidirectional antenna for transmitting and receiving short-wavelength radio waves may require precise manufacturing. When fed from the waveguide, a microstrip line may facilitate manufacturing of the omnidirectional antenna. The microstrip line may stabilize a structure of the omnidirectional antenna.

The omnidirectional antenna may be required to study various radio wave characteristics that occur when the radio waves move through space. In the case of a high frequency band such as a terahertz band, coaxial cables cannot be used due to high transmission loss, and the waveguide may be used. Therefore, the omnidirectional antenna fed from the waveguide may be required to study radio wave characteristics of the terahertz band. In addition, by adding the microstrip line to a radiating portion of the omnidirectional antenna, the microstrip line may radiate the radio waves. When the microstrip line radiates the radio waves, radiation characteristics may be improved compared to when the waveguide radiates the radio waves. When the microstrip line radiates the radio waves, structural stabilization may be achieved compared to when the waveguide radiates the radio waves. Adding the microstrip line to the radiating portion of the omnidirectional antenna may facilitate manufacturing.

However, the technical goals are not limited to those described above, and other technical goals may be present.

According to an aspect, there is provided an antenna including a waveguide configured to transmit a fed signal, a microstrip line configured to radiate the fed signal transmitted from the waveguide, and a radiation guide configured to guide the signal radiated from the microstrip line to omnidirectionally radiate the signal, wherein a waveguide cavity of the waveguide may be bent at least once within the waveguide so that two surfaces of the microstrip line meet perpendicularly to a central axis of the waveguide cavity.

The microstrip line may be formed by penetrating any one of two radiators of the radiation guide along a central axis of the radiation guide.

The microstrip line may include a flat conductor formed on a first surface of the two surfaces of the microstrip line and configured to receive the fed signal from the waveguide and a signal line formed on a second surface of the two surfaces of the microstrip line and configured to receive the fed signal from the flat conductor and radiate the fed signal.

The radiation guide may include a first radiator having a cylindrical shape in which any one of two bottom surfaces is wider than another and a second radiator having a same shape as the first radiator.

The first radiator and the second radiator may be arranged so that a central axis of the first radiator corresponds to a central axis of the second radiator and a gap exists between the first radiator and the second radiator.

The first radiator and the second radiator may be arranged so that a bottom surface of a narrower area of two surfaces of the first radiator and a bottom surface of a narrower area of two surfaces of the second radiator face each other.

One end, among two ends of the waveguide, penetrated by the microstrip line may be coupled to a bottom surface of a wider area of two surfaces of the second radiator.

A first end of two ends of the microstrip line may be located inside the waveguide cavity, and a second end of the two ends of the microstrip line may be located between the gap.

The antenna may further include a radome.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
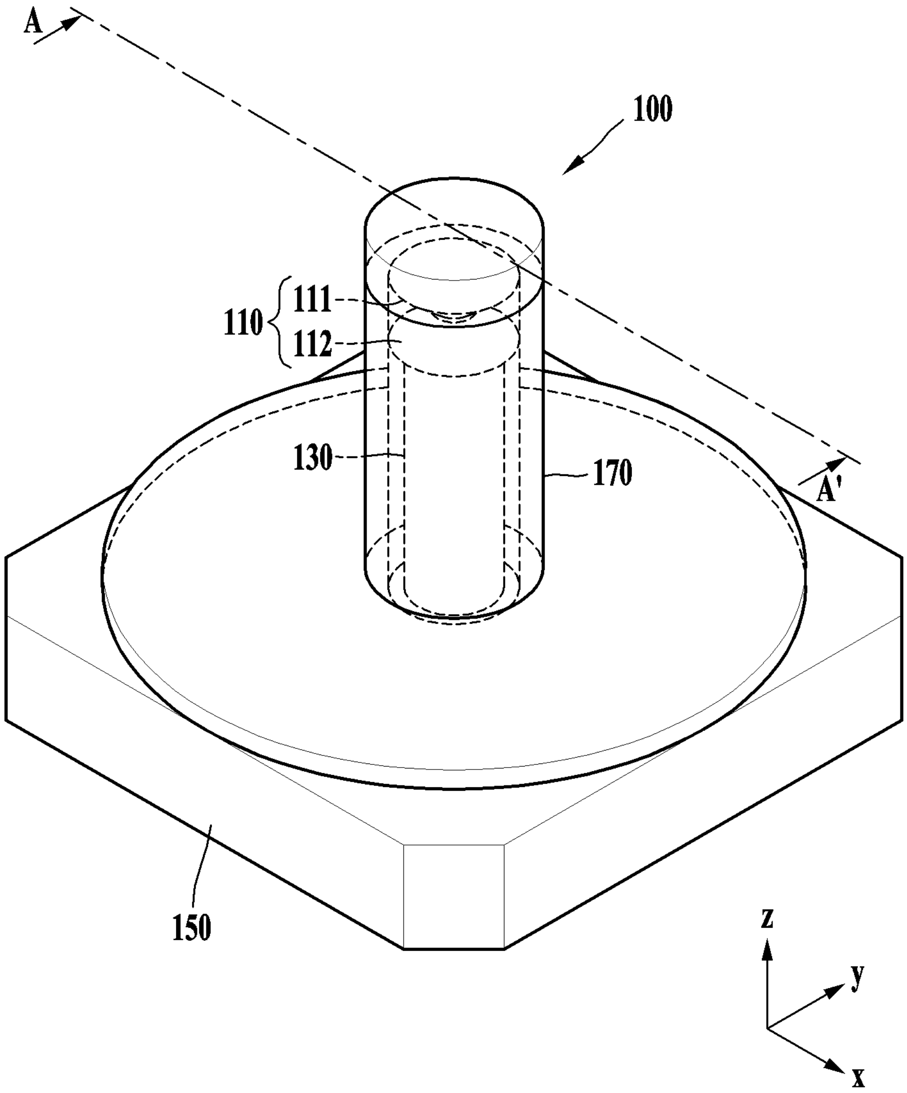
FIG. 1 is a diagram illustrating a structure of an omnidirectional antenna according to an embodiment.

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, the embodiments will be described in detail with reference to the accompanying drawings. When describing the embodiments with reference to the accompanying drawings, like reference numerals refer to like components and a repeated description related thereto will be omitted.

FIG. 1 is a diagram illustrating a structure of an omnidirectional antenna according to an embodiment.

Referring to FIG. 1, according to an embodiment, an omnidirectional antenna 100 may include a radiation guide 110, a waveguide 130, a waveguide flange 150, and a radome 170.

The waveguide 130 may be fed with a signal from a waveguide feeder (not shown). The waveguide feeder (not shown) may feed the signal to the waveguide 130. The waveguide 130 may transmit the fed signal to the radiation guide 110.

The radiation guide 110 may guide a radiated signal. The radiation guide 110 may include a first radiator 111 having a cylindrical shape in which any one of two bottom surfaces is wider than the other and a second radiator 112 having the same shape as the first radiator 111. The first radiator 111 and the second radiator 112 may be arranged so that a bottom surface of a narrower area of two surfaces of the first radiator 111 and a bottom surface of a narrower area of two surfaces of the second radiator 112 face each other. The radiation guide 110 may guide the radiated signal to be radiated in all directions. As the signal is radiated in all directions by the radiation guide 110, the omnidirectional antenna 100 may have high signal radiation efficiency.

The radome 170 may protect the omnidirectional antenna 100. For example, the radome 170 may protect the omnidirectional antenna 100 from external impact.

The waveguide flange 150 may be coupled (or connected) to the waveguide 130. The waveguide flange 150 may connect the waveguide 130 to another waveguide (not shown).

The operation of radiating the signal fed from the waveguide feeder is described in detail with reference to FIG. 2.

Figure 2:
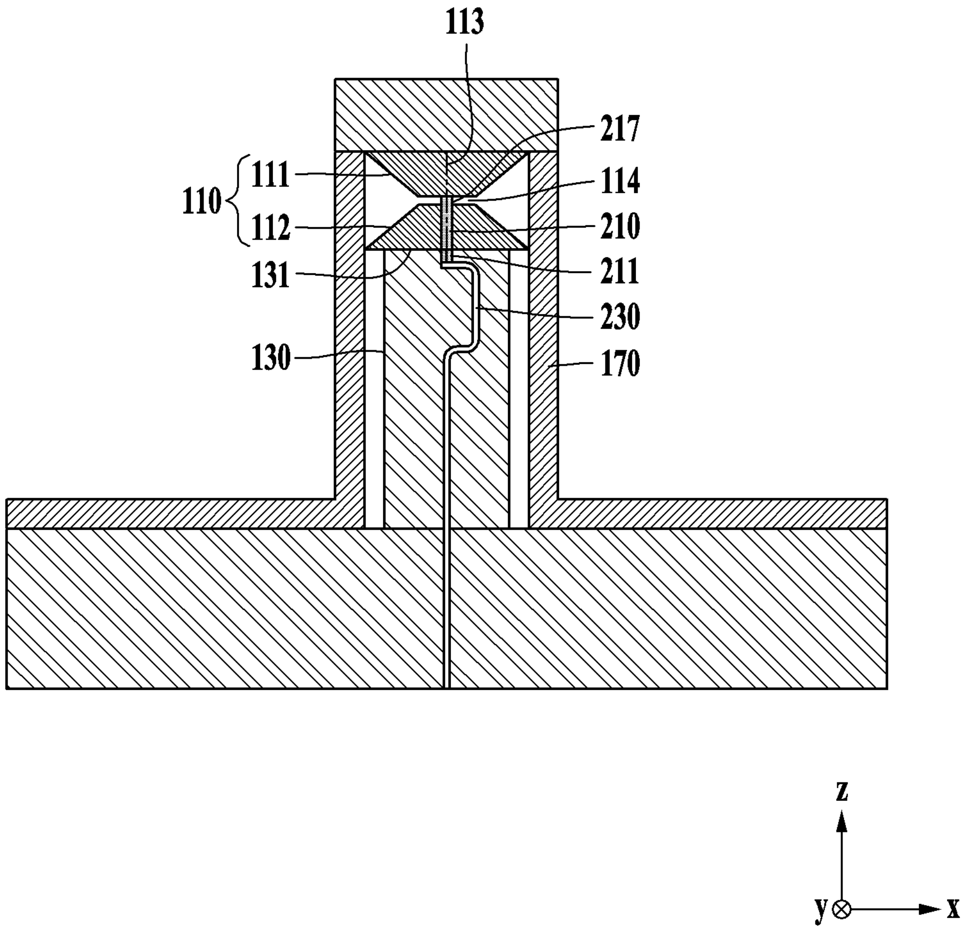
FIG. 2 is a cross-sectional view of an omnidirectional antenna.

FIG. 2 is a cross-sectional view of an omnidirectional antenna. FIG. 2 is illustrated based on a cutting line A-A' of FIG. 1.

Referring to FIG. 2, according to an embodiment, the omnidirectional antenna (e.g., the omnidirectional antenna 100 of FIG. 1) may further include a waveguide feeder, a waveguide cavity 230, and a microstrip line 210.

A signal may be fed through the waveguide feeder. The waveguide feeder may transmit the fed signal to the waveguide 130. For example, the fed signal may be transmitted through the waveguide cavity 230 of the waveguide 130.

The waveguide 130 may provide a traveling path for the fed signal. The waveguide cavity 230 of the waveguide 130 may be the traveling path for the fed signal. The waveguide cavity 230 may be located within the waveguide 130. The waveguide 130 may transmit the fed signal to the microstrip line 210. The waveguide cavity 230 may be bent at least once within the waveguide 130 to couple the waveguide 130 to the microstrip line 210. For example, the waveguide cavity 230 may be bent three times within the waveguide 130. In another example, the waveguide cavity 230 may be bent at least once at a right angle within the waveguide 130.

The microstrip line 210 may receive the signal fed from the waveguide 130. The microstrip line 210 may be formed by penetrating any one of the first and second radiators 111 and 112 of a radiation guide (e.g., the radiation guide 110 of FIG. 1) along a central axis 113 of the radiation guide 110. For example, the microstrip line 210 may be formed by penetrating the second radiator 112.

A central axis of the first radiator 111 and a central axis of the second radiator 112 may be the same as the central axis 113 of the radiation guide 110. The first radiator 111 and the second radiator 112 may be arranged so that a gap 114 exists between the first radiator 111 and the second radiator 112. A first end 211 of the microstrip line 210 may be located within the waveguide cavity 230, and a second end 217 may be located within the gap 114. The microstrip line 210 may penetrate one end 131 of the waveguide 130. The microstrip line 210 may radiate the signal transmitted from the waveguide 130 through the gap 114. The radiated signal may be proceeded in all directions based on signal reflection by each of the first radiator 111 and the second radiator 112 of the radiation guide 110.

Figure 3:
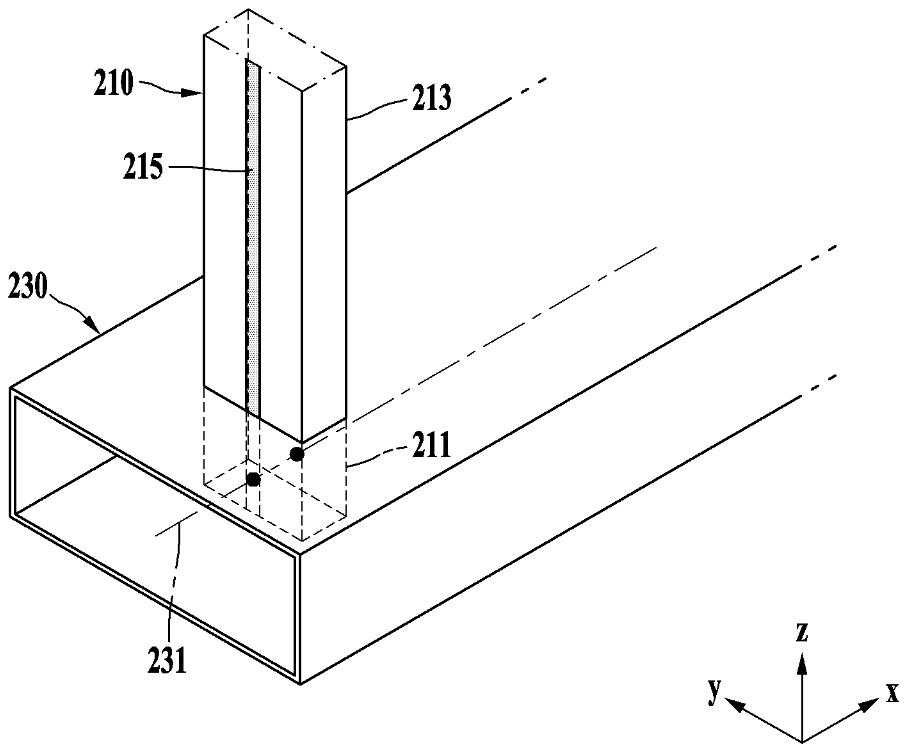
FIG. 3 is a diagram illustrating a combined structure of a microstrip line and a waveguide cavity of a waveguide, according to an embodiment.

FIG. 3 is a diagram illustrating a combined structure of a microstrip line and a waveguide cavity of a waveguide, according to an embodiment.

Referring to FIG. 3, according to an embodiment, the microstrip line 210 may include a flat conductor 213 and a signal line 215. The flat conductor 213 may be formed on a first surface of the microstrip line 210, and the signal line 215 may be formed on a second surface (e.g., a surface opposite to the first surface) of the microstrip line 210. The flat conductor 213 may be configured to receive a signal fed from the waveguide 130.

The first surface and the second surface of the microstrip line 210 may meet perpendicularly to a central axis 231 of the waveguide cavity 230, and the flat conductor 213 may also be formed perpendicularly to the central axis 231 of the waveguide cavity 230. As described above, the waveguide cavity 230 may be formed such that the waveguide cavity 230 is bent at least once within a waveguide (e.g., the waveguide 130 of FIG. 2) so that the flat conductor 213 is perpendicular to the central axis 231 of the waveguide cavity 230. A signal (e.g., the fed signal) travelling through the waveguide cavity 230 may reach the flat conductor 213. The flat conductor 213 may transmit the signal to the signal line 215.

Figure 4:
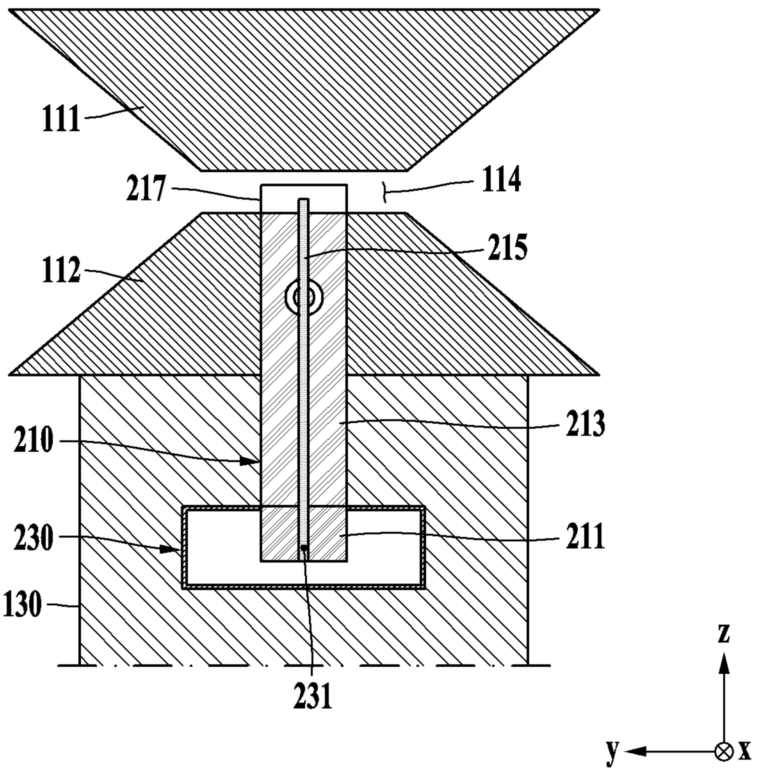
FIG. 4 is a diagram illustrating a shape of a microstrip line according to an embodiment.

FIG. 4 is a diagram illustrating a shape of a microstrip line according to an embodiment.

Referring to FIG. 4, according to an embodiment, the microstrip line 210 may be formed to penetrate any one of the first radiator 111 and the second radiator 112 of a radiation guide (e.g., the radiation guide 110 of FIG. 1) and one end (e.g., the end 131 of FIG. 2) of the waveguide 130. The end 131 of the waveguide 130 may be coupled (or connected) to the second radiator 112.

The signal line 215 may receive a signal from the flat conductor 213 and may radiate the received signal through the gap 114. The signal line 215 may be electrically connected to the flat conductor 213 through a conductive material formed by penetrating the microstrip line 210.

Figure 5:
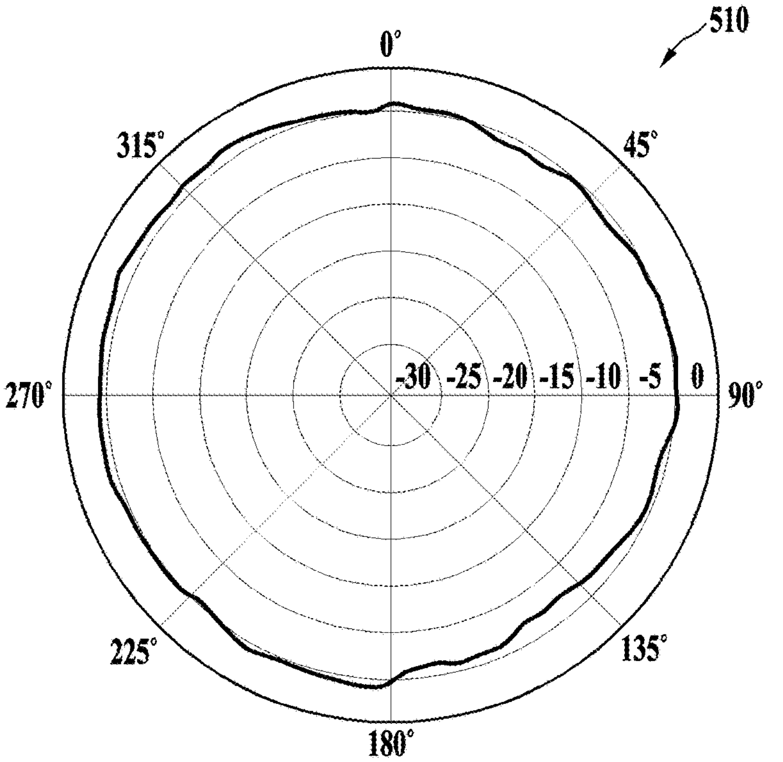
FIG. 5 is a diagram illustrating an example of a radiation pattern of an omnidirectional antenna.
Figure 5:
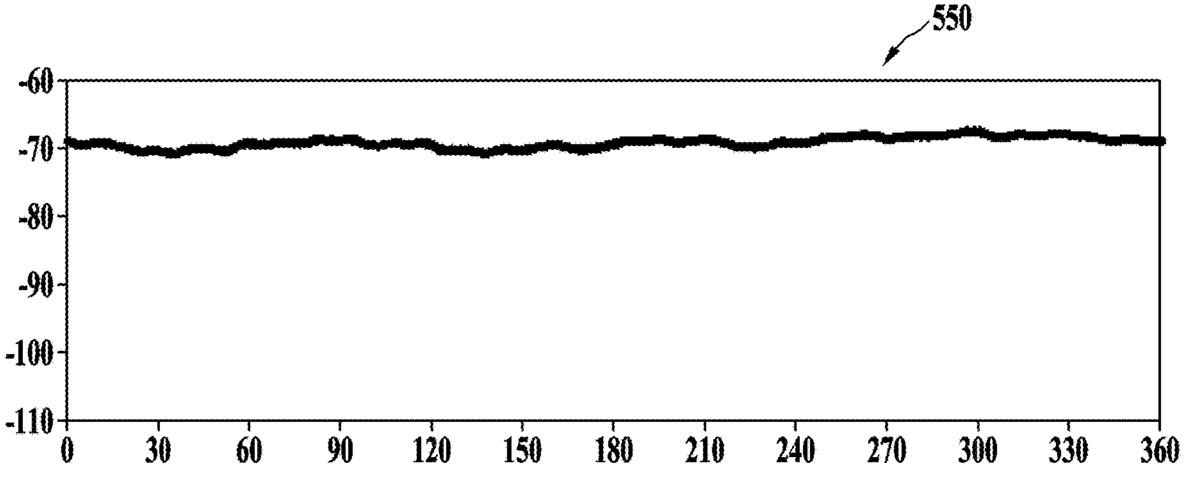

FIG. 5 is a diagram illustrating an example of a radiation pattern of an omnidirectional antenna.

Referring to FIG. 5, a radial graph 510 may represent an azimuthal pattern of a signal radiated from the omnidirectional antenna 100. The radial graph 510 shows that the omnidirectional antenna 100 may radiate a fed signal evenly in all directions.

The x-axis of a graph 550 may represent an azimuthal angle, and the y-axis may represent the magnitude of the signal. The graph 550 may represent that the fed signal radiated by the omnidirectional antenna 100 is radiated uniformly in all directions. The signal radiated from the omnidirectional antenna 100 may be radiated uniformly without being spatially biased.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments May be implemented by software, and the software may be recorded on a recording medium. The components, the functions, and the processes described in the embodiments may be implemented by a combination of hardware and software.

What is claimed is:

1. An antenna comprising:

a waveguide configured to transmit a fed signal;

a microstrip line configured to radiate the fed signal transmitted from the waveguide; and a radiation guide configured to guide the signal radiated from the microstrip line to omnidirectionally radiate the signal, wherein a waveguide cavity of the waveguide is bent at least once within the waveguide so that two surfaces of the microstrip line meet perpendicularly to a central axis of the waveguide cavity.

2. The antenna of claim 1, wherein the microstrip line is formed by penetrating any one of two radiators of the radiation guide along a central axis of the radiation guide.

3. The antenna of claim 1, wherein the microstrip line comprises:

a flat conductor formed on a first surface of the two surfaces of the microstrip line and configured to receive the fed signal from the waveguide; and a signal line formed on a second surface of the two surfaces of the microstrip line and configured to receive the fed signal from the flat conductor and radiate the fed signal.

4. The antenna of claim 1, wherein the radiation guide comprises:

a first radiator having a cylindrical shape in which any one of two bottom surfaces is wider than the other; and a second radiator having a same shape as the first radiator.

5. The antenna of claim 4, wherein the first radiator and the second radiator are arranged so that a central axis of the first radiator corresponds to a central axis of the second radiator and a gap exists between the first radiator and the second radiator.

6. The antenna of claim 5, wherein the first radiator and the second radiator are arranged so that a bottom surface of a narrower area of two surfaces of the first radiator and a bottom surface of a narrower area of two surfaces of the second radiator face each other.

7. The antenna of claim 5, wherein one end, among two ends of the waveguide, penetrated by the microstrip line is coupled to a bottom surface of a wider area of two surfaces of the second radiator.

8. The antenna of claim 5, wherein a first end of two ends of the microstrip line is located inside the waveguide cavity, and a second end of the two ends of the microstrip line is located between the gap.

9. The antenna of claim 1, further comprising:

a radome.

* * * * *